United States Patent [19]
Hickman

[11] 3,860,494
[45] Jan. 14, 1975

[54] PROCESS FOR PRODUCING AND MAINTAINING PURIFIED, STERILE WATER

[75] Inventor: Kenneth C. D. Hickman, Rochester, N.Y.

[73] Assignee: The United States of America as represented by the Secretary of the Interior, Washington, D.C.

[22] Filed: Aug. 29, 1972

[21] Appl. No.: 281,667

[52] U.S. Cl. ............ 203/10, 202/167, 202/177, 202/185, 202/195, 203/81, 203/82, 122/35, 159/DIG. 18, 165/105
[51] Int. Cl. ....... B01d 3/00, B01d 3/10, F28d 15/00
[58] Field of Search .......... 159/1 C, 27 A, DIG. 18; 202/182, 185, 189, 194, 195, 202, 165–167, 163, 176, 177, 184, 200; 203/10, 11, 74, 76, 77, , 81, 75, 82; 165/105, 108; 21/91, 103; 122/35

[56] References Cited
UNITED STATES PATENTS

| | | | |
|---|---|---|---|
| 2,073,446 | 3/1937 | Ellsberg | 203/74 X |
| 2,375,478 | 5/1945 | Lake | 203/76 X |
| 2,415,921 | 2/1947 | Wagner | 203/76 X |
| 2,426,706 | 9/1947 | Patterson | 203/76 X |
| 2,619,453 | 11/1952 | Andersen | 202/177 X |
| 2,733,693 | 2/1956 | Johnson | 159/1 C X |
| 2,839,122 | 6/1958 | Laguiharre | 159/4 |
| 2,895,909 | 7/1959 | Strickland | 203/22 X |
| 3,094,571 | 6/1963 | Wilson, Jr. et al | 260/681.5 |
| 3,286,763 | 11/1966 | Jacoby | 159/2 |
| 3,293,151 | 12/1966 | Holzer et al. | 202/200 X |
| 3,444,050 | 5/1969 | Sundquist | 202/202 X |
| 3,563,035 | 2/1971 | Raymond | 122/35 X |
| 3,736,234 | 5/1973 | Miyamoto | 202/202 |
| 3,794,566 | 2/1974 | Raal | 202/182 X |

FOREIGN PATENTS OR APPLICATIONS

| | | | |
|---|---|---|---|
| 225,898 | 12/1924 | Great Britain | 122/35 |
| 510,187 | 10/1930 | Germany | 122/35 |

*Primary Examiner*—Jack Sofer
*Attorney, Agent, or Firm*—William S. Brown

[57] ABSTRACT

In a system for maintaining purified, sterile distilled water under a permanent blanket of steam in a storage vessel, the improvement comprising supplying fresh distillate to the storage vessel which is already substantially filled with steam-blanket distillate, simultaneously removing some stored water from the reservoir, recycling said removed portion back to the still for repurification. Recycle conduits are positioned on the storage vessel to remove oldest water from the vessel. Heat transfer means or flow directing devices are provided to insure that water flows through the storage vessel in close approximation to plug flow.

3 Claims, 13 Drawing Figures

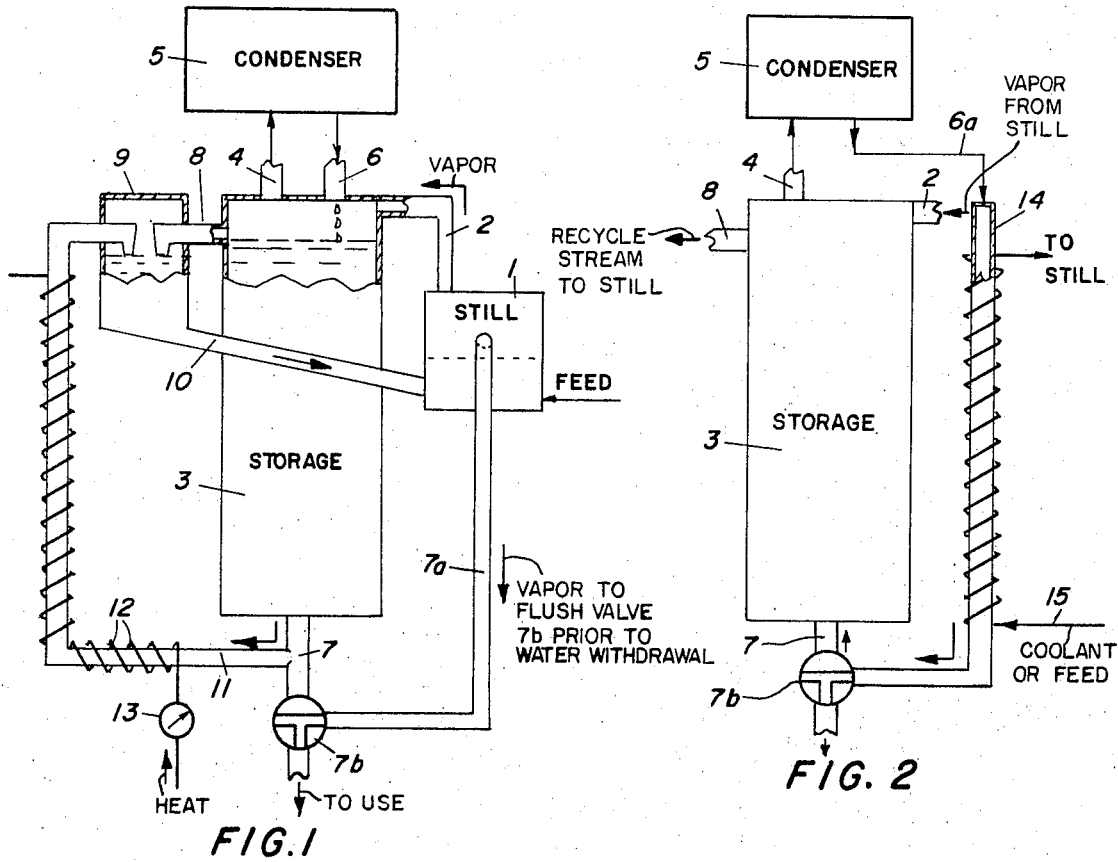
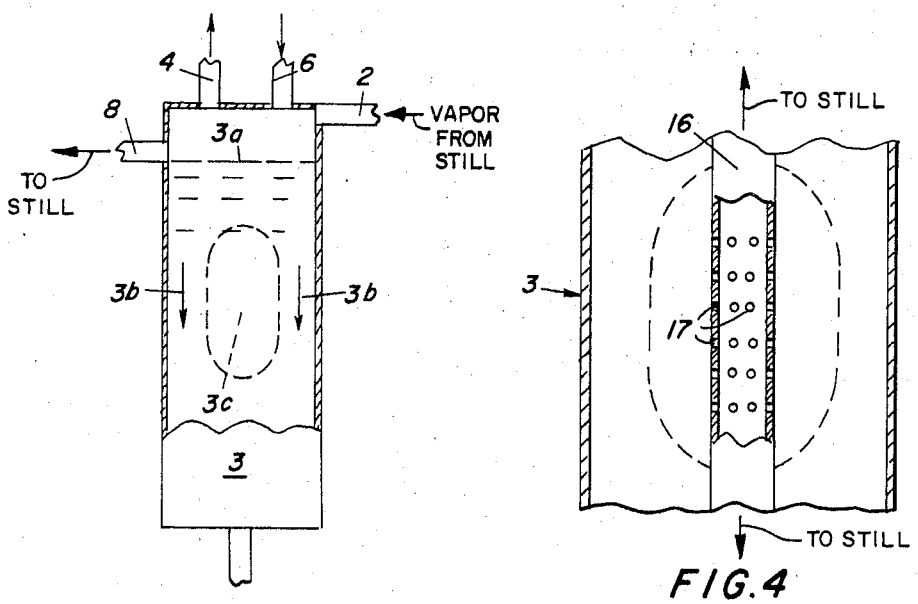

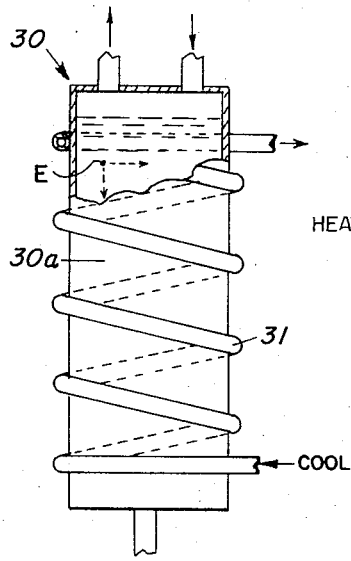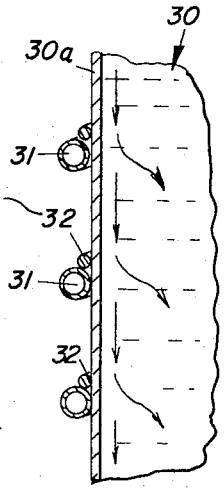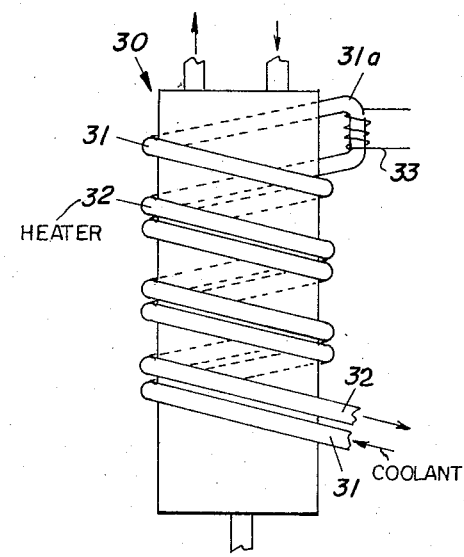
FIG.5a  FIG.5b  FIG.5c
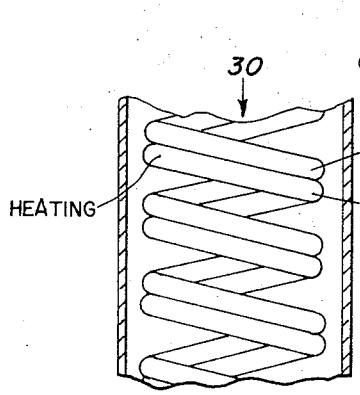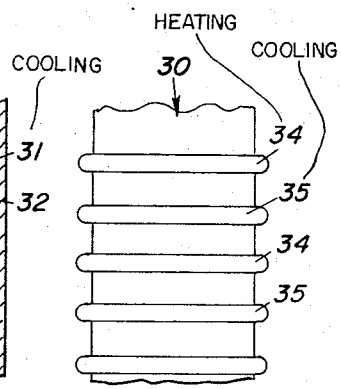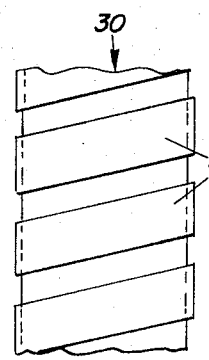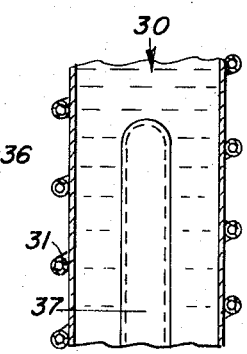
FIG.5d  FIG.5e  FIG.5f  FIG.5g
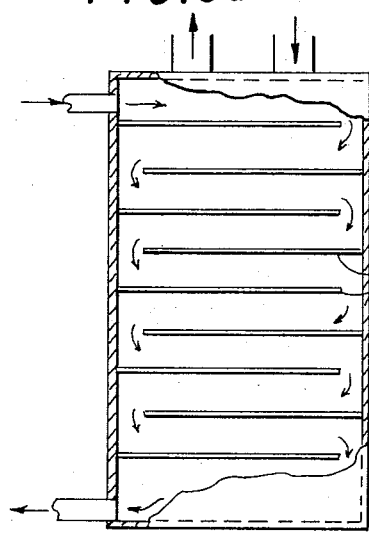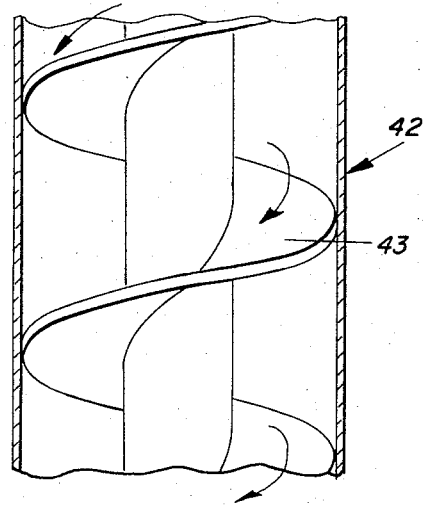
FIG.6a  FIG.6b

PROCESS FOR PRODUCING AND MAINTAINING PURIFIED, STERILE WATER

In copending application Ser. No. 244,155 is described a novel system for producing and permanently maintaining sterile distilled water. In said application, water of good quality, usually potable, is distilled, and the resulting distilled water is maintained in an enclosed storage zone or reservoir having a permanent blanket of steam over the water to essentially exclude air from contacting the top surface of the collected water and to maintain the top surface at or near its boiling temperature while permitting the main bulk of water in the reservoir to be cooled to ambient temperature.

I have now developed a system to further improve the quality of the water in the storage zone. Broadly, the invention comprises supplying fresh distillate to the storage reservoir which is already substantially filled with steam-blanketed distillate; simultaneously removing some stored water from the reservoir while maintaining the reservoir in a substantially filled condition; and recycling said removed portion back to the still to repurify it and thereby discharge from the storage zone impurities that may have collected on the top surface of the stored water or have seeped into the stored water from materials of construction. Preferably, the major portion of the recycle stream is removed from the storage vessel at a point substantially removed from the point of distillate entry into the vessel. In this manner the recycle stream, rather than being freshly-introduced distillate, is mainly composed of water that has resided in the storage vessel for an extended period of time and thus is far more likely to contain storage zone impurities.

Generally the recycle is composed of (a) overflow from the storage vessel and/or (b) underflow (a stream of water from the bottom of the storage vessel), and/or (c) middle flow, that is, a stream of water from the central portion of the body of water in the vessel, and/or a selected admixture of two or more of these streams.

I have further developed a system for insuring that the recycle stream is mainly composed of stored water which has resided in storage for the longest period of time (the "oldest" water). In a storage reservoir, wherein the top surface of the water is maintained at or near boiling, while the main bulk of water is near ambient temperature, a phenomenon occurs in which the hot water at the top of the reservoir continuously mixes with cool water at the base, only partially displacing water in the intermediate regions. This short-circuiting phenomenon, hereinafter also referred to as thermal mixing, is caused by the cooling of a thin sheath of water next to the vessel walls (fastest cooling at the top of the vessel), with subsequent sliding down of the densified sheath. In one aspect of the present invention, to compensate for this phenomenon, and thereby to insure that the "oldest" water in storage is repurified, the main body of the recycle stream is tapped as middle flow from the central portion of the body of water in the storage reservoir.

Alternatively, special heat transfer means or flow directing devices are disposed within or around the reservoir to minimize or overcome the thermal mixing or short-circuiting phenomenon, and to cause water to move between the top and bottom of the reservoir in close approximation to plug flow.

With regard to the phrase "close approximation to plug flow" the following reasoning and examples are presented to define this phrase: A vessel is completely filled with water colored blue. Water colored pink is now added to the top of the vessel while equal amounts of blue liquid are removed from the bottom of the vessel. Under ideal plug flow, as the pink water displaces the blue water a sharp dividing line is seen between the two layers, and when replacement is complete the vessel is filled with pink water containing no trace of blue, and the blue water collected from the bottom contains no trace of pink. On the other hand, it can be calculated that under conditions of exponential mixing between the blue water and pink water, as when a stirrer is operating in the vessel, it will require more than 7 volumes of pink water to reduce the amount of blue water in the vessel to 1/1000 of the initial quantity.

Under conditions of "close approximation to plug flow," as this phrase is used throughout the specification and claims, the addition of 1 volume of pink water will remove at least 40 percent of the blue water, which operation can therefore be referred to as at least 40 percent of plug flow. To secure close approximation to plug flow, the water is caused to flow in a tortuous path within the reservoir traversing in series substantially every portion of the volume before reaching the far end, i.e., top to bottom or bottom to top. This internal manifolding of flow is at its most efficient when the water is maintained in close approximation to a series of stratified thermal layers or planes decreasing in temperature from top to bottom; all particles of water pass in series through the planes so that in effect the whole mass of water moves vertically downward (or upward) with little intermixing.

To insure removal of the "oldest" water from such a system, it is simply a matter of introducing distillate at the top or bottom end of the body of stored water, and removing the recycle stream from the opposite end.

As used throughout the specification and claims the term "permanently" or "permanent" means that conditions are imposed without interruption so long as there is power available to supply steam to the storage vessel or the still is to be dismantled or closed down for other compelling reasons. The term "steam" means saturated or superheated steam.

It is therefore an object of the present invention to provide high purity sterilized water.

Another object is to secure water that is not only devoid of organic life but is purer with respect to other contaminants than hitherto available from simple apparatus constructed from ordinary materials.

A further object is to provide means for minimizing the indiscriminate remixing of freshly distilled water with previously distilled or perhaps long-stored water in the reservoir, thus enabling the repurification and improvement in quality to be secured as expeditiously and as economically as possible.

A still further object is to provide water at a higher degree of purity than obtainable in a single distillation by redistilling the oldest water from the distillate storage vessel.

Yet another object is to provide such high purity water by recycling water, for the purpose of redistillation, from a storage reservoir through which distilled water moves with approximate plug flow.

Other objects and advantages will be obvious from the following detailed description of the invention taken in conjunction with the drawings in which:

FIG. 1 is an embodiment of the system of the present invention;

FIG. 2 is an alternative embodiment for feeding distillate to the storage vessel of FIG. 1;

FIG. 3 illustrates thermal mixing within the storage vessel of FIG. 1;

FIG. 4 is an alternative embodiment for recycling distillate from the storage vessel of FIG. 1;

FIGS. 5a–5g are alternate heat transfer systems for establishing plug flow in the storage vessel of FIG. 1; and FIGS. 6a–6b are alternate flow directing systems for establishing plug flow.

Referring first to FIG. 1 therein is shown the present invention in one of its simpler forms. Reference numeral 1 designates the still or evaporator in which "crude" usually potable water is vaporized. The steam is conveyed by conduit 2 to storage reservoir 3, and from there through conduit 4 to condenser 5. A steam bleed (not shown) can be provided as in copending application Ser. No. 244,155. Distillate passes through conduit 6 to storage reservoir 3. When required, water is withdrawn for use through conduit 7.

If desired, a conduit 7a can be provided to deliver steam from still 1 (or another source) to three-way valve 7b to thereby flush said valve and exit tube 7 prior to releasing product water. By partial turning of valve 7b, the product water may be warmed by said steam prior to use. Although not essential to the objects of the present invention, the system of the present invention can also include any of the expedients illustrated in copending application Ser. No. 244,155.

When the storage vessel has been filled to a maximum predetermined level, as shown, for example, in FIG. 1, distillation is still continued; and additional distillate is supplied to storage by conduit 6. Displaced storage water leaves the vessel through overflow spout 8 which scavenges the top surface of the stored water and conveys water to receptable 9 which is connected by recycle conduit 10 to still 1.

Additionally, an underflow conduit 11 is provided to convey displaced water from the bottom of reservoir 3 to receptacle 9. A heater 12 can be disposed around conduit 11 to assist the water in rising therethrough. By the simple expedient of adjusting the heat to heater 12 via a regulator 13, more or less underflow is removed by conduit 11. If the underflow is reduced, the overflow will increase provided that distillate is continuously delivered to the reservoir.

Besides minimizing impurities in the product water, the regulation of the proportions of underflow and overflow provides for control over the temperature of the product water within the reservoir.

As shown in FIG. 1, distillate is delivered to the top of the storage reservoir 3. Accordingly, it is desirable to provide the major proportion (at least 60 percent) of the recycle from the underflow stream so as to insure that the recycle stream is mainly composed of water that has resided in the reservoir for an extended period of time rather than being freshly-introduced distillate.

Referring to an alternative arrangement in FIG. 2, distillate from condenser 5 is delivered to storage by conduit 6a and pipe 14 without access to air. Within pipe 14 the distillate is cooled by heat exchanger 15, and thereafter delivered to the bottom of storage vessel 3. In this arrangement, to insure that the recycle is not freshly introduced distillate, most of the recycle stream is provided by overflow spout 8. The cooling medium for heat exchanger 15 may provide as needed the feed water for the system's still. After passage through the heat exchanger 15, the heated water, in required proportion, is conveyed to the still.

Referring now to FIG. 3, therein the short-circuiting or thermal mixing phenomenon discussed above is schematically illustrated. It is well known that hot water will float upon cold water as it does, for instance, on a lake in summer time. It is less well known that while hot water can be stored in a tank above cold water, the hotter and colder water are continually changing places with one another if the tank loses heat through the side walls to the surroundings. When the tank is a temporary resting place for hot water, and the water is required to be cooled in passage through the tank, relatively vigorous mixing occurs between the upper and lower contents during passage. When cooling, as by randomly placed water coils or the surroundings, is applied to the walls of the tank, colder water slides over the coils or down the walls, collects near the bottom and streams up at the center. In FIG. 3, reservoir 3 is spontaneously cooled in air. Distillate 3a at boiling point floats on the surface, the periphery of the liquid layer becoming cooled and thus heavier, so that a fraction 3b streams down the walls. The center dotted circle 3c represents stagnant water which remains barely disturbed by the sheath flow downwards and by the more sluggish upturn from the bottom.

FIG. 4 illustrates an apparatus for tapping the stagnant or oldest water within the system of FIG. 3. In this manner, repurification is directed chiefly towards stored water that contains the greatest amount of impurities, which thereby maximizes the reduction of impurities in the storage reservoir. Referring to FIG. 4, a recycle conduit 16 is concentrically disposed in the reservoir 3. Perforations 17 are provided in the middle third of the conduit so that the somewhat stagnated, intermediate fraction 3c of the stored water can be recycled to the still for repurification through the top (or perhaps the bottom) of conduit 16.

As an alternative solution to the problem of securing the "oldest" water for recycle, in FIG. 5a is shown a simple means for essentially overcoming short-circuiting or thermal mixing in the storage reservoir. Therein is depicted a storage tank 30 with a spiral cooling coil 31 wrapped outside the walls 30a, the walls being of modest thermal conductivity lengthwise, e.g., made of glass, or thin nickel, or stainless steel. The cold spiral 31 will produce a local spiral region of lowered temperature and increased density, $\Delta p$. An element of cooled water, e.g., at E, will have the choice of falling vertically or along the path of the spiral to replace water that has already departed. The steeper the spiral, the greater the proportion of water that will follow the spiral path. For this portion of the water, the time of descent will be proportional to $\pi \cdot$ diameter $\cdot$ height/(cosec angle of descent)$^2$, that is the path will become longer and the pull lessened according to the number of turns of cooling coil or $\sim 1/$ (cosec angle of descent)$^2$. If, however, the number of turns is too great, or virtually great because of high lateral thermal conductance of the tank walls, most of the cooled water will flow straight down, and the beneficial effect will be lost. Within the present invention the spirals are angled at between about 3° and 30° whereby the travel of the intermittently cooled water is substantially delayed towards plug flow, i.e., the water flows between top and bottom of the reservoir as a series of stratified thermal layers or planes. The coils of course, do not cover the entire surface of the reservoir side walls, but instead define a spiral band of "uncovered" wall, the width of the band usually being at least equal to the width of an individual coil.

Once a close approximation to plug flow is established within the reservoir, as by the coil of FIG. 5a, the "oldest" water in the reservoir is removed simply by tapping the recycle stream at a point essentially most vertically distant from the point of distillate entry. For example, if cooled distillate is introduced into the storage reservoir at the bottom thereof as in FIG. 2, the major portion of the recycle stream is tapped as overflow at the top. Alternatively if hot distillate is delivered to the top to the reservoir as in FIG. 1, the major proportion of recycle is provided by underflow from the bottom.

Further means to provide a close approximation plug flow are shown in FIG. 5b. Spiral coils are provided which produce alternate cooling and heating of the walls of the reservoir. Reference numeral 30a designates a cross-section of the vertical wall of the reservoir 30, and numeral 31 designates a cooled spiral winding disposed around the outside of the wall. A spiral heating element 32 (e.g., electric resistance wire or hot fluid) conforms to the same portion of the wall and follows the lead of the cooling coil. An operating requirement is that the quantity of heat added by the element 32 shall be less than the quantity of heat extracted by the coil 31. That is, the cooling coil has an overall higher heat transfer capacity. The function of the heating spiral is to rewarm the fraction of water descending vertically and deflect its path into the spiral-cooled stream of water above it. This combination is often more effective than either a hot spiral or a cooled spiral alone.

FIG. 5c shows a variant of FIG. 5b where the warmed water 31a issuing from the cooling spiral 31 is led to a down flowing interleaved spiral to provide the heating coil 32. Heat exchanger 33 is provided to add or subtract heat if necessary from warm water 31a. The net and desired result is to cool the contents of the tank, because the water issues from the down spiral at a higher temperature than it entered the up spiral.

While the cooperative action is well exhibited when each individual heater is directly above a cooling coil as shown in FIGS. 5b and 5c, useful action in delaying mixing of the contents of the storage reservoir is observed with any relative spacing between the coils.

Rather than positioning the alternate heating and coiling coils around the outside of the reservoir, they can be immersed within the reservoir as shown in FIG. 5d, or be contiguous with or fastened to the inner wall of the reservoir.

Still further, as shown in FIG. 5e, the alternate coils need not be spirally wound, but may simply consist of a series of vertically spaced, alternate heating and cooling rings 34 and 35, respectively, which generate discrete zones of thermally stratified liquid.

Yet a further modification for alternate heating and cooling is shown in FIG. 5f. Therein spiral thermal lagging 36 is applied to the walls of the reservoir interspacing a spiral of unlagged wall. The unlagged portion intermittently cools the water in the manner of the cooling coil of FIG. 5a. As a further variant (not shown), the lagging can be disposed around the reservoir as a series of rings in the manner of FIG. 5e.

Yet still another exemplary modification for heating and cooling which may be employed in combination with FIGS. 5a–f is shown in FIG. 5g. Therein a hollow or solid vertical cylindrical member 37 extends to or through the top of reservoir 30. This member serves the double purpose of preventing dead spots in the center of the reservoir, and of permitting thermal adjustment by internal application (within the member 37) of heating and/or cooling zones, spirals, etc.

As disclosed above, flow directing devices such as baffles, packings or septa can also be employed within the storage reservoir to force the water to flow from side to side during its passage from the top to bottom (or bottom to top) of the reservoir. Exemplary devices are illustrated in FIGS. 6a and 6b. In FIG. 6a within storage vessel 40 are a series of horizontal baffles 41 which cause zigzag flow, while in FIG. 6b the water flows through an enclosed spiral passage between the top and bottom of reservoir 42. Hot distillate can be delivered to the top of either storage reservoir, and the "oldest" water for recycle purposes is withdrawn from the bottom. Alternatively, as in FIG. 2, the hot distillate from the condenser is cooled, and then delivered to the bottom of such reservoirs. The water then moves upwardly through the reservoir in close approximation to stratified-layer (plug-flow) fashion, with minimal turbulence. The "oldest" portion is then tapped from the top of the reservoir.

By the system of the present invention, throughputs of from about 85 to 95 percent of plug flow have been established. It can be calculated that, at 95 percent of plug flow, it requires about 1.5 volumes of "pink water" to reduce the amount of "blue water" in the storage vessel to 1/1000 of its initial quantity.

It will be obvious to those skilled in the art that many combinations of FIGS. 1 through 6 can be employed in the practice of the invention.

I claim:

1. In a process for producing purified sterile water from impure water wherein said impure water is evaporated and condensed, and the resultant distillate is collected in a vertically disposed storage zone having a permanent blanket of steam above said distillate, said steam being supplied by evaporation of said impure water, the improvement comprising supplying fresh distillate from evaporation of said impure water and the condensation of the resulting vapors thereof as said fresh distillate, to the upper end of said storage zone which is already substantially filled with steam-blanketed distillate, simultaneously removing some distillate from said zone while maintaining said zone in a substantially filled condition, recycling said removed distillate back to said evaporation step for repurification, the major amount of said removed distillate being withdrawn from said storage zone at a point substantially removed from the point of distillate entry into said zone, whereby said removed distillate is mainly composed of distillate that has resided in said storage zone for an extended period of time.

2. The process of claim 1 wherein the fresh distillate enters said storage zone at the top thereof, and the major amount of said recycle stream is removed from the bottom portion of the distillate in said zone.

3. The process of claim 1 in which the distillate in said storage zone, during distillate input and recycle withdrawal, flows in a tortuous path within said zone traversing substantially every portion of the volume between the top and bottom of said storage zone at close approximation to plug flow.

* * * * *